United States Patent
White

(10) Patent No.: US 7,306,658 B2
(45) Date of Patent: Dec. 11, 2007

(54) HIGH PURITY AIR AND GAS FRACTIONATION SYSTEM

(75) Inventor: Donald H. White, Savage, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 341 days.

(21) Appl. No.: 10/949,064

(22) Filed: Sep. 24, 2004

(65) Prior Publication Data

US 2005/0109205 A1    May 26, 2005

Related U.S. Application Data

(60) Provisional application No. 60/507,573, filed on Sep. 30, 2003, provisional application No. 60/505,523, filed on Sep. 24, 2003.

(51) Int. Cl.
*B01D 53/04* (2006.01)

(52) U.S. Cl. .................................................. 96/132

(58) Field of Classification Search .................. 95/116, 95/117, 129, 137, 139, 140, 143; 96/131, 96/132
See application file for complete search history.

(56) References Cited

U.S. PATENT DOCUMENTS

| | | | |
|---|---|---|---|
| 4,452,612 A | 6/1984 | Mattia | |
| 4,830,641 A * | 5/1989 | White et al. | ................... 96/130 |
| 4,973,339 A | 11/1990 | Bansal | |
| 5,202,096 A | 4/1993 | Jain | |
| 5,443,623 A * | 8/1995 | Jonas et al. | ..................... 95/101 |
| 5,656,065 A | 8/1997 | Kalbassi et al. | |
| 5,669,962 A | 9/1997 | Dunne | |
| 5,735,938 A | 4/1998 | Baksh et al. | |
| 5,755,857 A | 5/1998 | Acharya et al. | |
| 5,846,295 A | 12/1998 | Kalbassi et al. | |
| 5,906,673 A | 5/1999 | Reinhold, III et al. | |
| 5,922,640 A | 7/1999 | Hirai et al. | |
| 6,074,459 A * | 6/2000 | Gingrich et al. | ............... 95/118 |
| 6,113,869 A * | 9/2000 | Jain et al. | .................... 423/219 |
| 6,284,021 B1 | 9/2001 | Lu et al. | |
| 6,319,303 B1 * | 11/2001 | Guillard et al. | ................. 95/97 |
| 6,444,012 B1 | 9/2002 | Dolan et al. | |
| 6,511,640 B1 * | 1/2003 | Kumar et al. | ................ 423/210 |
| 6,572,681 B1 * | 6/2003 | Golden et al. | ................. 95/122 |
| 6,610,124 B1 | 8/2003 | Dolan et al. | |

(Continued)

FOREIGN PATENT DOCUMENTS

DE        30 45 451 A1    7/1981

(Continued)

*Primary Examiner*—Frank M. Lawrence
(74) *Attorney, Agent, or Firm*—Pauly, Devries, Smith & Deffner, L.L.C.

(57) ABSTRACT

An air and gas purification system having combined adsorbent material layers in a regenerable adsorbent system. A first adsorbent material, molecular sieve material, is positioned at the inlet end of the adsorbent bed and a second material, activated alumina, is positioned at the outlet end. Additional adsorbent materials may be positioned between the inlet adsorbent material and the outlet adsorbent material. This system, utilizing the combination of adsorbent layers, is particularly useful for fuel cell applications, where the adsorbent system is positioned in the incoming oxidant stream to reduce, and preferably remove, the contaminants that would affect the efficiency of the fuel cell. Using such a system allows using ambient air as the oxygen source.

2 Claims, 1 Drawing Sheet

U.S. PATENT DOCUMENTS

| | | |
|---|---|---|
| 6,706,097 B2 | 3/2004 | Zornes |
| 2003/0029314 A1* | 2/2003 | Nakamura et al. ............ 95/117 |
| 2003/0200866 A1* | 10/2003 | Weyrich et al. ............... 95/129 |
| 2004/0237789 A1* | 12/2004 | Baksh et al. .................. 96/131 |

FOREIGN PATENT DOCUMENTS

| | | | |
|---|---|---|---|
| DE | 3045451 A | * | 7/1981 |
| EP | 0514058 A1 | * | 11/1992 |
| EP | 0 584 747 A1 | | 3/1994 |
| EP | 0 832 678 A2 | | 4/1998 |
| JP | 55028745 | | 2/1980 |

\* cited by examiner

FIG. 1
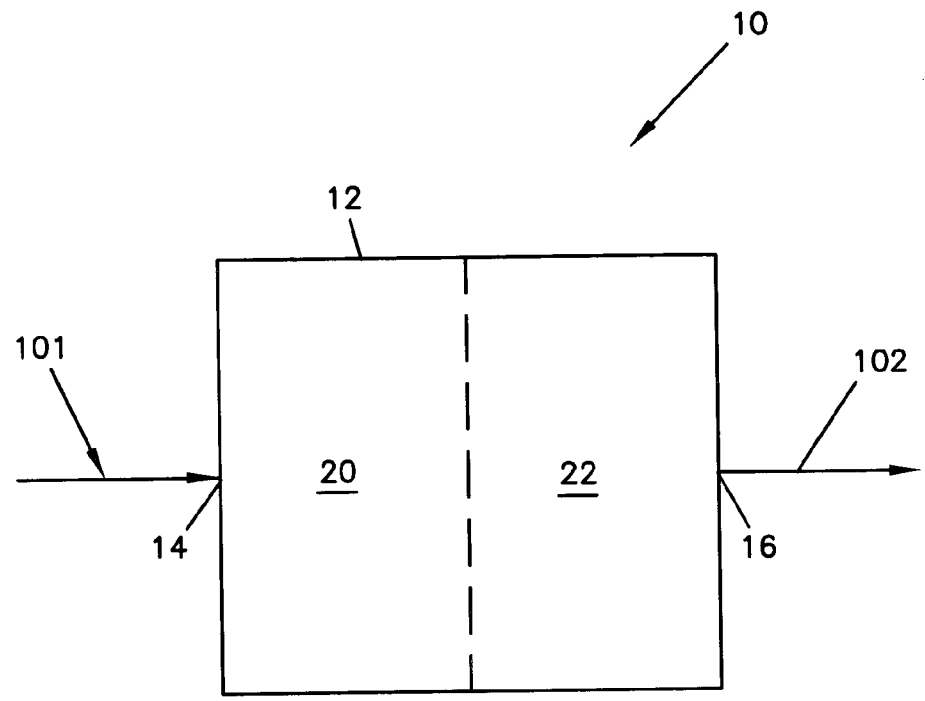
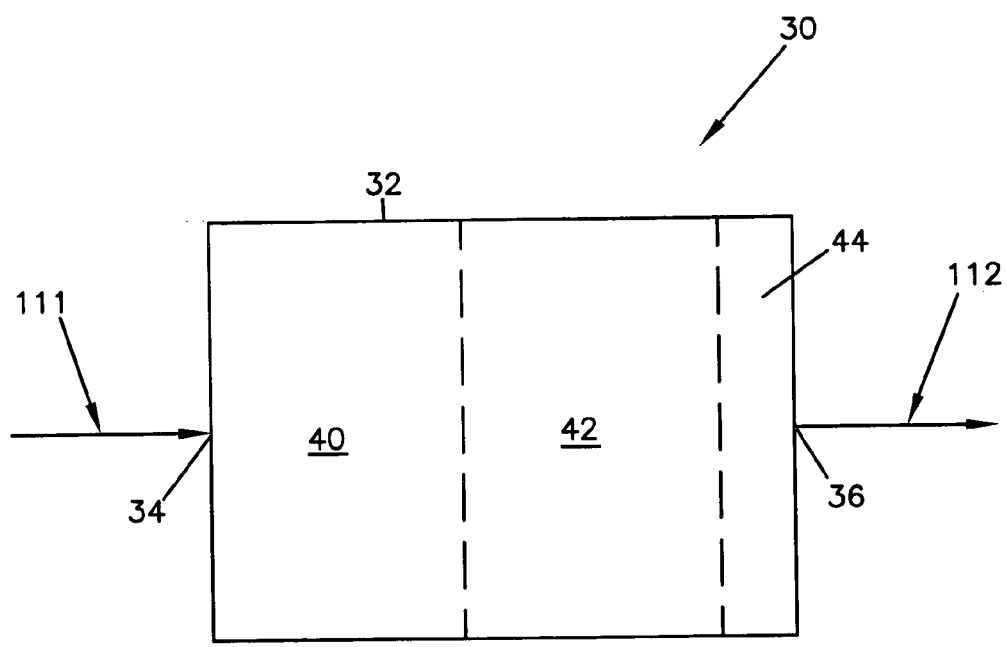
FIG. 2

HIGH PURITY AIR AND GAS FRACTIONATION SYSTEM

This application claims priority under 35 U.S.C. § 119(e) to provisional applications Ser. No. 60/505,523 filed Sep. 24, 2003 and 60/507,573 filed Sep. 30, 2003. The complete disclosure of these applications is incorporated by reference herein.

FIELD OF THE INVENTION

This application is related to air filtering systems. In particular, the application is directed to packed bed adsorbent systems and methods for removing particulate and chemical contaminants to provide high purity air.

BACKGROUND

High purity air and other gases such as nitrogen and hydrogen are often required in critical applications. Such critical applications include laboratory instrumentation, breathing air systems, hospital compressed air, pharmaceutical processing, and electronic parts manufacturing air used for cleaning computer boards. In laboratories, such as for automotive emission testing, pure air is required as the oxidizer in flame ionization detectors (FID's), as the calibration gas for infrared detectors (IRD's), and as the carrier gas in gas chromatography analyzers. Purified air is also required in cryogenic separation apparatus used to produce liquid oxygen and nitrogen to prevent riming of the heat exchangers with carbon dioxide and water, and to prevent product contamination with oil vapors.

In the past, complex systems were generally needed to produce purified air. These systems often included high temperature catalytic converters that were very expensive. The product air from prior art systems typically met the following contamination limits:

|  | Inlet Concentration | Outlet Concentration |
| --- | --- | --- |
| Water vapor | 20,000 ppmv | ≦1.0 ppmv |
| Hydrocarbons | 20 ppmv* | ≦1.0 ppmv* |
| Nitrogen oxides | 5 ppmv | <0.1 ppmv |
| Carbon dioxide | 400 ppmv | ≦5.0 ppmv |
| Carbon monoxide | 20 ppmv | ≦1.0 ppmv |

(*as methane equivalent)

Analytical instruments have been advanced and sensitive in recent years and are able to detect lower levels of contaminants. With the improved dectectability, air and other gas purity requirements have become more stringent. For example, breathing air requirements are constantly being increased. Overall, the result is the desire for improved quality, lower contaminant concentration, in air and other gases.

For example, a newly developing field, fuel cells, particularly those using hydrogen as a fuel, require relatively low levels of contaminants in both the hydrogen source and the air stream used for oxidizing the hydrogen. Generally, at least one of the air or the hydrogen fuel, or both, must have very low levels of contaminants, in order to maintain the high efficiency of the fuel cell and to prevent contamination of the fuel cell materials. Contaminants, including sulfur oxides (SOx) and nitrogen oxides (NOx), hydrogen sulfide and volatile organic compounds (VOC's), dramatically reduce the efficiency of fuel cells and cause their deterioration. Current air purification systems are not adequate to meet the needs of the modern industrial requirements. Usually, the hydrogen and air or oxygen is provided from cylinders or other tanks, the gas having been purified to acceptable levels.

Alkaline or PEM fuel cells, which have been used in applications such as the Space Shuttle, are particularly prone to various contaminants, such as hydrocarbons and nitrogen oxides (NOx). Additionally, the efficiency of alkaline fuel cells is greatly reduced, if not completely destroyed, by the presence of carbon dioxide ($CO_2$) in the oxidant stream. Alkaline fuel cells have prospered in applications such as space because purified compressed oxygen has been used.

As the knowledge of fuel cells increases, fuel cells are moving out of the laboratory and the controlled environment. Operation of fuel cells, in uncontrolled environments, is particularly detrimental to the fuel cell. Various filtration arrangements have been proposed for fuel cells systems. See, for example, U.S. Pat. Nos. 6,432,177 and 6,638,339 (Dallas et al.), U.S. Pat. No. 6,780,534 (Stenersen et al.), U.S. Pat. No. 6,783,881 (Stenersen et al.), and U.S. Pat. No. 6,797,027 (Stenersen et al.), which provide various solutions for air purification for fuel cells. Additional and alternate filtration arrangements would be beneficial.

SUMMARY OF THE DISCLOSURE

The system of the present invention is directed to a packed bed adsorption system that includes at least two different absorbent materials, arranged in series. The invention also includes the use of a packed bed having at least two different adsorbent materials, in series. A first adsorbent material is positioned at the inlet end of the adsorbent bed and the second material is positioned at the outlet end. The first material or inlet material, present at the inlet end of the absorbent bed, is a molecular sieve material. The second material or outlet material, present the outlet end of the adsorbent bed, is activated alumina. Additional materials may be positioned between the inlet adsorbent material and the outlet adsorbent material. Catalytic sorbent is a preferred additional material. The system is preferably a pressure-swing, regenerable adsorbent system.

A significant improvement in air and gas purification by adsorption fractionation has been found in the use of specifically combined adsorbent layers in a regenerable adsorbent system. This system, utilizing the combination of adsorbent layers, is particularly useful for fuel cell applications, where the adsorbent system is positioned in the incoming oxidant stream to reduce, and preferably remove, the contaminants that would affect the efficiency of the fuel cell. Using such a system allows using ambient air as the oxygen source.

The system, utilizing the two absorbent materials, alumina and molecular sieve material, greatly reduces the contamination level of the purified air and gas as compared to prior systems. The system of the current invention can provide high purity air and gas streams containing very low contamination levels.

The system is capable of providing purified air or gas, that has no more than 1% of the input level of water vapor, no more than 5% of the input level of hydrocarbons, no more than 5% of the input level of nitrogen oxides, no more than 5% of the input level of sulfur oxides, no more than 5% of the input level of carbon dioxide, and no more than 5% of the input level of carbon monoxide. In some designs, the purified air of gas has no more than 0.1% of the input level of water vapor, no more than 1% of the input level of hydrocarbons, no more than 1% of the input level of nitrogen oxides, no more than 1% of the input level of sulfur oxides, no more than 1% of the input level of carbon dioxide, and no more than 1% of the input level of carbon monoxide.

BRIEF DESCRIPTION OF THE DRAWINGS

FIG. 1 is a schematic diagram of a gas purification system according to the present invention; and FIG. 2 is a schematic diagram of a second embodiment of a gas purification system according to the present invention.

DETAILED DESCRIPTION

The present invention is directed to adsorption systems to provide "zero" hydrocarbon quality air, "absolute air", "respiratory air", and other high purity compositions of air and other gases. By use of the term "zero hydrocarbon air", "zero air", and variations thereof, what is intended is air having no more than 0.003 ppm hydrocarbon vapor and no more than 1 ppm carbon dioxide. By use of the term "absolute air", what is intended is air having no more than 100 ppb carbon dioxide and no more than 10 ppb NOx and SOx. By the use of "respiratory air", what is intended is air having no more than 500 ppm carbon dioxide, no more than 10 ppm carbon monoxide, no more than 5 ppm sulfur dioxide, no more than 2.5 ppm nitric oxide or nitrogen dioxide, and preferably no more than 0.003 ppm hydrocarbon. "General breathing air" can have up to 25 ppm hydrocarbon.

Pressure swing adsorption systems have found great acceptance due to their simplicity, low initial cost, and possibility of regeneration. Larger systems, those that handle air flows of at least 1,000 scfm, typically favor temperature swing adsorption because of its lower operating cost. The system of the current invention provides improvement in the performance of the pressure swing adsorption systems for purifying air.

One of the principles in the design of a regenerable adsorbent bed, also referred to as a pressure swing adsorber, is the need to retain the heat of adsorption within the adsorbent bed, specifically, in the outlet region of the adsorbent bed. The adsorption system of the present invention provides increase heat retention, by providing a packed bed that includes at least two different absorbent materials, arranged in series. The first adsorbent material is positioned at the inlet end of the adsorbent bed and the second material is positioned at the outlet end. Additional adsorbent materials may be positioned between the inlet adsorbent material and the outlet adsorbent material.

Referring now to the figures, the system of the present invention will be generally described. In FIG. 1, system 10 includes adsorbent bed 12 that purifies incoming stream 101 to create exhaust stream 102. Incoming stream 101 enters bed 12 via inlet 14 and exits as exhaust stream 102 via outlet 16. Adsorbent bed 12 includes a first adsorbent material 20 located proximate inlet 14 and a second adsorbent material 22, downstream of first material 20, located proximate outlet 16.

The first material or inlet material, present at the inlet end of the absorbent bed, is a molecular sieve material. The adsorbent bed generally has 40% to 80% molecular sieve by volume, more preferably 50% to 70%, and most preferably about 60% by volume. Molecular sieves have a high capacity for removal of contaminant vapors from the gas passing therethrough. It is beneficial to remove a high amount of the contaminants at the beginning of the adsorption bed.

The second material or outlet material, present the outlet end of the adsorbent bed, is activated alumina. In general, the adsorbent bed includes 10% to 50% activated alumina, preferably 20% to 40%, and most preferably about 30% by volume. By use of activated alumina, a higher flow rate through the material is obtained than compared to the use of molecular sieve; the combination of the two materials provides improved flow through the entire bed. Additionally, the alumina, being denser than molecular sieve material (approx. 50 lbs/cu ft vs. 42 lbs/cu ft) provides more heat storage and allows higher flow rates.

As stated above, the adsorbent bed generally includes 40% to 90% molecular sieve by volume, preferably 50% to 70%, and most preferably about 60% by volume. There are many commercially available molecular sieve materials, having various micropore sizes. In one embodiment of the adsorbent bed of the present invention, the preferred molecular sieve is "13X", which is well known in the adsorbent filed. This material, "13X", has an average micropore size of about 10 angstroms. Such a micropore size is allows adsorption of most contaminant vapors, including the large size hydrocarbon molecules.

Also as stated above, the adsorbent bed generally includes 10% to 60% activated alumina, preferably 20% to 40%, and most preferably about 30% by volume. The alumina is preferentially a high efficient activated alumina with a B.E.T. surface area of about 320 to 360 square meters/gram. Such a B.E.T. surface area provides a large quantity of contaminant vapor adsorption.

By using a molecular sieve/alumina combination that provides, by weight, 50% molecular sieve and 50% alumina material as the absorbent material, the bed of adsorbent is 10% heavier than a bed with only molecular sieve material. This increase in mass is an increase in the mass of material available for heat retention. Additionally, a 10% greater flow rate can be achieved with a 50/50 combination of alumina/molecular sieve than compared to a bed with only molecular sieve material. Exploratory testing proved this theory, of more heat storage and higher flow rates, to be true. Significantly greater purity in the product air was also discovered.

It is known that molecular sieves have good adsorption capacities at elevated concentrations and are therefore normally the preferred adsorbent for packed beds for chemical contaminant removed. However, their adsorbing capabilities greatly decrease at levels below 1 ppmv for water vapor and hydrocarbons, and below 5 ppmv for carbon dioxide.

Alumina has much lower adsorption capacity for contaminant vapors. It was discovered, however, that aluminas continue to adsorb at lower concentrations, as much as 10 fold lower in concentration, than molecular sieves. Additionally, alumina has a much higher desorption mass transfer rate than molecular sieves, because the micropores of alumina are much larger, approximately 20-50 angstroms vs. approximately 4-10 angstroms, than those of molecular sieves. Because of its slower desorption rate, molecular sieves tend to retain some of the contaminant vapor even after regeneration, especially in pressure swing adsorbers which operate on short cycle times. The contaminant vapors retained by the molecular sieve are slowly leached out of the molecular sieve after the adsorbent bed is returned to on-stream service and, thus, these earlier-removed vapors contaminate the product air or gas preventing the attainment of higher quality purification. Alumina is regenerated quickly because of its larger micropores and does not cause product contamination. By providing alumina downstream of the molecular sieve, these leaching contaminants are removed by the alumina.

As stated above, additional materials may also be present in the adsorbent bed. In a preferred embodiment, catalyst sorbent is preset at the outlet of the adsorbent bed.

Referring again to the figures, an alternate embodiment the system of the present invention will be generally described. In FIG. 2, system 30 includes adsorbent bed 32 that purifies incoming stream 111 to create exhaust stream 112. Incoming stream 111 enters bed 32 via inlet 34 and exits as exhaust stream 112 via outlet 36. Adsorbent bed 32 includes a first adsorbent material 40 located proximate inlet 34, a second adsorbent material 42 located downstream of first material 40, and a third material 44 located proximate outlet 36. First material 40 is molecular sieve, second material 42 is alumina, and third material 44 is catalyst sorbent.

The amount of catalytic sorbent in the adsorbent bed is generally 0% to 20%, preferably 5% to 15%, and most preferably about 10% by volume. Examples of suitable catalyst sorbents include hopcalite (i.e., 80% manganese dioxide and 20% copper oxide), copper oxide impregnated carbon, potassium permanganate impregnated alumina, or an admixture of such catalytic material. The catalyst may be intimately mixed with the alumina, as a discrete layer between the alumina and the molecular sieve, or as a discrete layer between the alumina and the outlet. It was found that the purity of the product air or gas was further improved by the inclusion of the catalyst sorbent.

By inclusion of a catalytic sorbent, the majority of the residual hydrogen sulfide not removed by the molecular sieve is converted to hydrogen gas and free elemental sulfur, sulfur oxides are converted to oxygen gas and free sulfur, and carbon monoxide is converted to carbon dioxide. The carbon dioxide is purged from the system during the regeneration step. The result is very little free sulfur being released via the outlet of the adsorbent bed.

In one particular embodiment, the regenerable adsorber system has a packed adsorbent bed that includes molecular sieve absorbent material at the inlet end of the bed, activated alumina absorbent material through most of the outlet end, and a catalytic sorbent at the very end of the bed. The amounts of material in the bed, as a volume percentage, are about 50 to 70% molecular sieve, 20 to 40% alumina, and 5 to 15% catalytic sorbent. In a preferred embodiment, amounts of material in the bed, as a volume percentage, are about 60% molecular sieve, 30% alumina, and about 10% catalytic sorbent.

Purified Air or Gas from the Adsorbent System

With the system of the current invention, utilizing the combination of molecular sieve and alumina, the following contaminant reduction levels can be obtained.

| Contaminant | % Contaminant Removal | Preferred % Contaminant Removal | More Preferred % Contaminant Removal |
|---|---|---|---|
| Water vapor | ≧99% | ≧99.9% | ≧99.995% |
| VOC's | | | |
| Hydrocarbons | ≧95% | ≧99% | ≧99.5% |
| Other VOC's | ≧95% | ≧99% | ≧99.5% |
| Nitrogen oxides | | | |
| Urban Conc. | ≧95% | ≧99% | ≧99.6% |
| Normal Conc. | ≧90% | ≧95% | ≧99% |
| Sulfur oxides | | | |
| Urban Conc. | ≧95% | ≧99% | ≧99.6% |
| Normal Conc. | ≧90% | ≧95% | ≧99% |
| Carbon dioxide | ≧95% | ≧99% | ≧99.875% |
| Carbon monoxide | ≧95% | ≧99% | ≧99.5% |

Hydrocarbon volatile organic compounds (VOC's) include toluene and benzene (non-methane aromatic hydrocarbons), methane, ethane, ethane, propane, butane, isopentane, and high molecular weight hydrocarbons (>100 amu's). Other volatile organic compounds include hydrogen sulfide, hydrogen fluoride, methyl chloride, sulfur dioxide and nitrogen dioxide.

As an example, from the inlet contaminant concentrations provided, the following output concentration levels can be achieved using the system of the current invention.

| | Inlet Conc. | Outlet Conc. | Preferred Outlet Conc. | More Preferred Outlet Conc. |
|---|---|---|---|---|
| Water vapor | 20,000 ppmv | ≦50 ppmv | ≦10 ppmv | ≦1.0 ppmv |
| VOC's | | | | |
| Hydrocarbons | 20 ppmv* | <10 ppmv | <1 ppmv | <0.10 ppmv* |
| Other VOC's | 20 ppmv | <10 ppmv | <1 ppmv | <0.10 ppmv |
| Nitrogen oxides | | | | |
| Urban Conc. | 5 ppmv | <1 ppmv | <0.1 ppmv | <0.020 ppmv |
| Normal Conc. | 0.2 ppmv | <1 ppmv | <0.1 ppmv | <0.002 ppmv |
| Sulfur oxides | | | | |
| Urban Conc. | 5 ppmv | <1 ppmv | <0.1 ppmv | <0.020 ppmv |
| Normal Conc. | 0.5 ppmv | <1 ppmv | <0.1 ppmv | <0.005 ppmv |
| Carbon dioxide | 400 ppmv | <10 ppmv | <1 ppmv | ≦0.500 ppmv |
| Carbon monoxide | 20 ppmv | <10 ppmv | <1 ppmv | ≦0.100 ppmv |

(*as methane equivalent)

Optional Equipment of the System

As stated above, the regenerable adsorptive system according to the present invention, utilizing the two absorbent materials, alumina and molecular sieve material, provides purified air or gas that has greatly reduced levels of the contaminants. Preferred embodiments of the system also include catalytic sorbent.

The system includes the appropriate piping to provide air or other gas to be cleansed to the packed bed and purified air or gas from the bed. Additional filtration elements, such as particulate filters or other chemical filters, may be present in the system, either upstream or downstream of the regenerable adsorbent bed. Typically any particulate filter is positioned upstream of the adsorbent bed. Any secondary chemical filter is preferably positioned downstream of the adsorbent bed.

For example, the system can be further improved by installing a guard bed of sorbent downstream of the adsorbent bed. Such a guard bed is particularly beneficial in case of adsorbent system failure, such as by electrical controller malfunction, or if the operating conditions are altered so as to overload the adsorber. The adsorbent bed can become overloaded and fail to produce high purity air for various reasons: for example, if the flow rate is significantly increased above the design conditions; if the inlet temperature is dramatically increased; if the operating pressure is decreased; or if the concentration of the incoming contaminant vapors is beyond the design levels. The downstream guard bed is a secondary adsorbent bed that will act as a safety net, in case the primary adsorbent bed does fail. The guard bed will remove and retain contaminants that pass through the outlet of the primary adsorbent bed, due to failure of the adsorbent bed for any number of reasons. The guard bed will also remove and retain remnant contaminants that might allude capture in the primary regenerable adsorbent bed.

The guard bed preferably includes hopcalite media at the inlet of the guard bed. Hopcalite is preferred to convert carbon monoxide to carbon dioxide. A chemisorbent impregnated carbon is also preferably present in the guard bed. The chemisorbent impregnated carbon can be a carbon impregnated with a reactant such as potassium iodide, potassium carbonate, sodium hydroxide, or urea salts. The impregnated carbon will adsorb and convert to nitrates and sulfates many of the contaminant vapors. The resulting compounds are retained in the carbon media. Other vapors such as VOC's will be adsorbed and retained in the micropores of the carbon media.

Use of Regenerable Adsorbent System

The purified air or other gas obtained from the layered system of the invention can be utilized for any number of applications that desire the use of highly pure air or other gas. One particular application that would benefit from highly purified air is fuel cell systems. Fuel cells are devices having two electrodes (an anode and a cathode) that sandwich an electrolyte. Various fuel cells are known, however, the proton exchange membrane (PEM) fuel cell is most common.

For PEM fuel cells, a hydrogen fuel source is directed to the anode, where the hydrogen electrons are freed, leaving positively charged ions. The freed electrons travel through an external circuit to the cathode and, in the process, provide an electrical current that can be used as a power source for external electrical circuits. The positively charged ions diffuse through the fuel cell electrolyte and to the cathode where the ions combine with the electrons and oxygen to form water, a by-product of the process. To speed the cathodic reaction, a catalyst is often used.

The PEM fuel cell is a popular fuel cell configuration for use in powering vehicles due to its low temperature operation, high power density and ability to quickly vary its power output to meet shifts in power demand. The PEM fuel cell is often simply referred to as a "low temperature fuel cell" because of its low operation temperature, typically about 70 to 100° C., sometimes as high as 200° C.

High temperature fuel cells, such as solid oxide fuel cells, are typically not as sensitive to chemical contamination due to their higher operating temperature. High temperature fuel cells are, however, sensitive to some forms of chemical contamination, and thus high temperature fuel cells may benefit from high purity air.

The threshold levels of contaminants that are acceptable by various fuel cells are dependent on the design of the fuel cell. For example, hydrocarbons (methane and heavier), ammonia, sulfur dioxide, carbon monoxide, silicones, and the like, are known to occupy space on the catalyst and inactivate the sites to reaction. Thus, these contaminants need to be removed prior to their entering the reactive area of the fuel cell.

The exact level of contamination, and types of contaminants that are acceptable will vary depending on the catalyst used, the operating conditions, and the catalytic process efficiency requirements. The adsorptive bed system of the present invention removes contaminants from the air before the air is used in the fuel cell operation.

It is to be understood, however, that even though numerous characteristics and advantages of the present disclosure have been set forth in the foregoing description, together with details of the structure and function of the disclosure, such disclosure is illustrative only, and is not intended to be limiting to the scope of the invention in any manner, other than by the appended claims. The invention is not to be limited to the described embodiments, or to use with any particular type of fuel cell or other equipment, or to the use of specific components, configurations or materials described herein. All alternative modifications and variations of the present invention which fall within the broad scope of the appended claims are covered.

What is claimed:

1. A regenerable adsorbent bed comprising:
   (a) an inlet, adsorbent material, and an outlet, the inlet supplying a flow of dirty gas to the adsorbent material, and the outlet providing a flow of purified gas from the adsorbent material;
   (b) the adsorbent material comprising, as a percentage by volume of the total adsorbent material present:
      (i) 50-70% first adsorbent material positioned proximate the inlet, the first adsorbent material comprising molecular sieve;
      (ii) 5-15% catalytic sorbent positioned proximate the outlet; and
      (iii) 20-40% second adsorbent material positioned between the first adsorbent material and the catalytic sorbent, the second adsorbent material comprising alumina.

2. The adsorbent bed according to claim 1, wherein the adsorbent material comprises, as a percentage by volume of the total adsorbent material present:
   (a) about 60% molecular sieve;
   (b) about 30% alumina; and
   (c) about 10% catalytic sorbent.

* * * * *